Jan. 27, 1953 E. KELLER 2,626,528

DRIVE FOR SOUND RECORDING AND REPRODUCING MACHINES

Filed March 13, 1950 2 SHEETS—SHEET 1

INVENTOR.

Ernst Keller

BY Richards & Geier

ATTORNEYS

Jan. 27, 1953 E. KELLER 2,626,528

DRIVE FOR SOUND RECORDING AND REPRODUCING MACHINES

Filed March 13, 1950 2 SHEETS—SHEET 2

INVENTOR.
Ernst Keller
BY Richards & Geier
ATTORNEYS

Patented Jan. 27, 1953

2,626,528

UNITED STATES PATENT OFFICE 2,626,528

DRIVE FOR SOUND RECORDING AND REPRODUCING MACHINES

Ernst Keller, New York, N. Y., assignor to Machine Tool Works Oerlikon, Administration Company, Zurich/Oerlikon, Switzerland, a company of Switzerland Application March 13, 1950, Serial No. 149,233

3 Claims. (Cl. 74—210)

This invention relates to sound recording and reproducing machines, and refers more particularly to magnetic sound recorders and reproducers wherein the sound carrier has the form of a sheet carried upon a support.

An object of the present invention is the provision of a simple, but effectively operating, drive for recording and reproducing machines of this type.

Another object is the provision of a drive which is elastic and which is suitable for the continuous stopping and starting required of recording machines of the described type.

Yet another object is the provision of a drive which is adapted to the nature of operations of the sheet-carrying drum which must stop and start quickly and therefore, has very little inertia.

A further object is the provision of a drive system by means of which the so-called "wow" or frequency flutter is effectively eliminated, despite the comparatively small drum inertia.

Yet another object is the provision of a drive wherein pressure is effectively and substantially equally distributed between the elements of the drive, thereby eliminating frequency flutter.

Other objects will become apparent in the course of the following specification.

The objects of the present invention may be realized through the provision of a drive which includes a rubber-coated disk or wheel which is slidably mounted upon a frame support. A magnet is used to move the disk to an operative position. A follower is mounted upon the free end of a pivoted lever and the follower is maintained by gravity in engagement with the magnet-operated disk, in such manner that in the inoperative position of the device the follower is out of engagement with the motor shaft.

In the operative position of the disk a connection is established between the sheet-carrying drum, on the one hand, and a motor-driven disk on the other. Throughout this connection steel surfaces are maintained in contact with rubber-coated surfaces and an equal distribution of forces takes place.

The invention will appear more clearly from the following detailed description, when taken in connection with the accompanying drawings showing, by way of example, preferred embodiments of the inventive idea.

Figure 1:
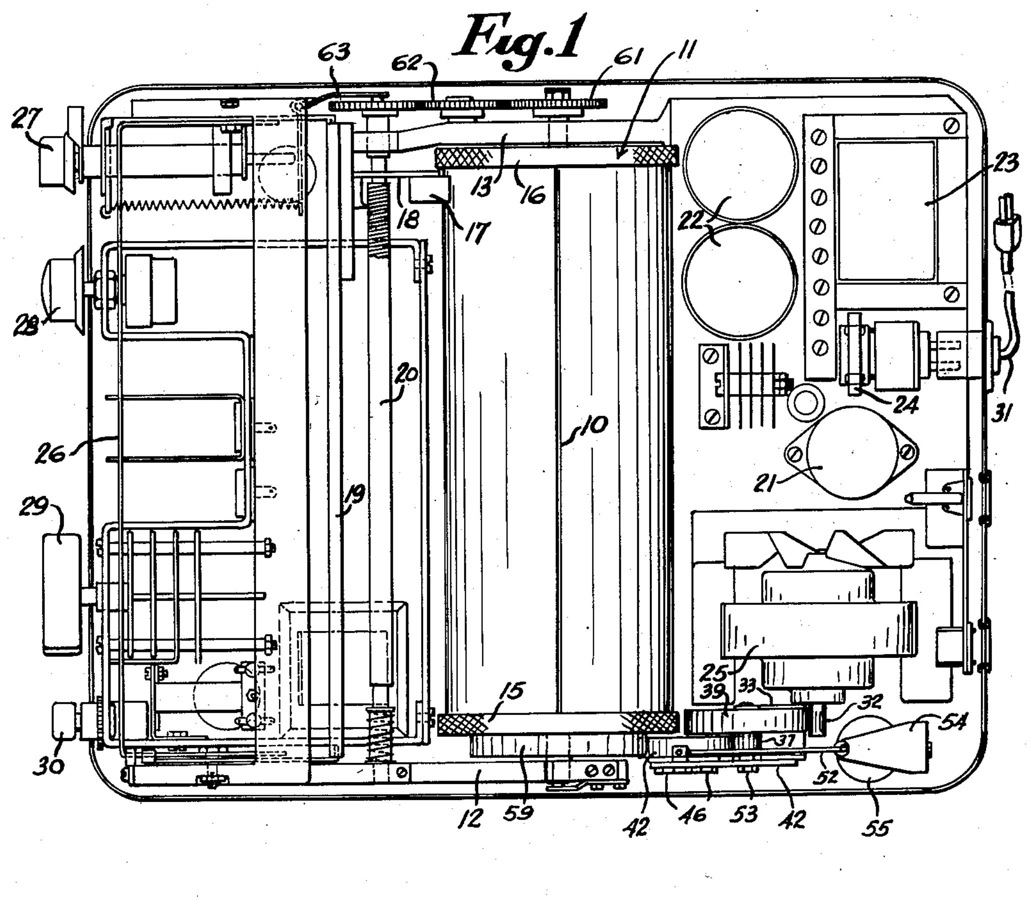
Figure 1 is a plan view of a recording and reproducing machine constructed in accordance with the principles of the present invention, with the cover removed.
Figure 2:
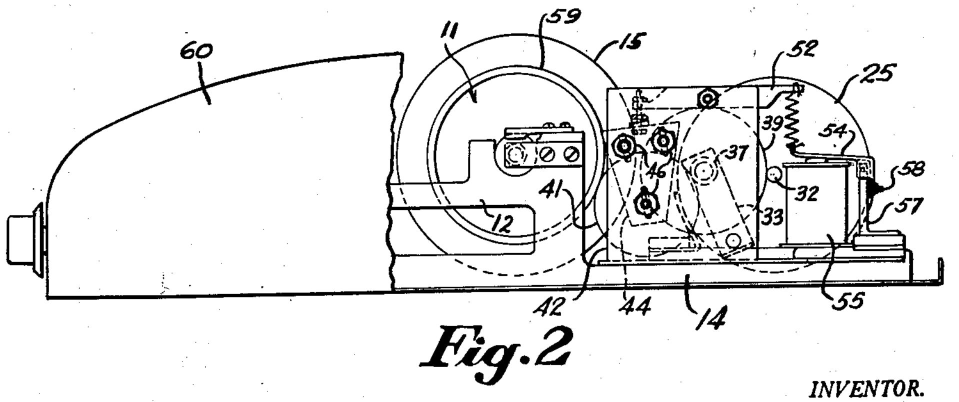
Figure 2 is a side view of the machine with the cover partly broken off.

The sound recording and reproducing device shown in the drawings is of the type wherein a magnetic sheet (not shown) is inserted with one edge into a slot 10 of a rotary drum 11, and is thereupon wrapped around the drum. The drum 11 is carried upon supporting brackets 12 and 13 which are mounted upon a base plate 14. The drum 11 is provided with projecting preferably knurled, flanges 15 and 16, which serve as guides for the recording sheet.

The recording of the sound upon the recording sheet and the reproduction of the sound are effected by means of a sound head 17 which rests lightly upon the sound carrier for the purpose of recording sound thereon, or reproducing the sound. The sound head 17 is connected to a lever 18 which is mounted upon a rod 19 and is in engagement with a threaded spindle 20. It is apparent that when the spindle 20 is rotated the lever 18 and head 17 will move along the spindle 20 and the drum 11.

This construction is in part described and claimed in my co-pending application, Serial No. 118,153, filed September 27, 1949.

The electric rectifier section of the machine, which includes rectifier tube 21 and condensers 22, as well as the transformer 23 and a fuse 24, is of standard construction and does not constitute a part of the present invention. It may be supplied with electric current from the mains, which are also used to drive a motor 25.

The head 17 may be shifted manually along the rod 19 by a spacer mechanism which is described in detail, and claimed, in the co-pending patent application of Ernst Keller and Hans Sigrist, filed December 21, 1949, Serial No. 134,278.

The head 17 is raised off the magnetic sheet by means of a bar 26, actuated by a spacer key not shown in the drawing.

In addition the machine is provided with a track tuner 27, volume control and mains switch 28, a change-over switch 29 for recording and play-back, as well as the start-stop switch 30.

The electrical current is supplied from the mains through wires 31.

This part of the mechanism is indicated diagrammatically in the drawings since it does not constitute the subject matter of the present invention, which is concerned with the drive for the drum 11.

Figure 3:
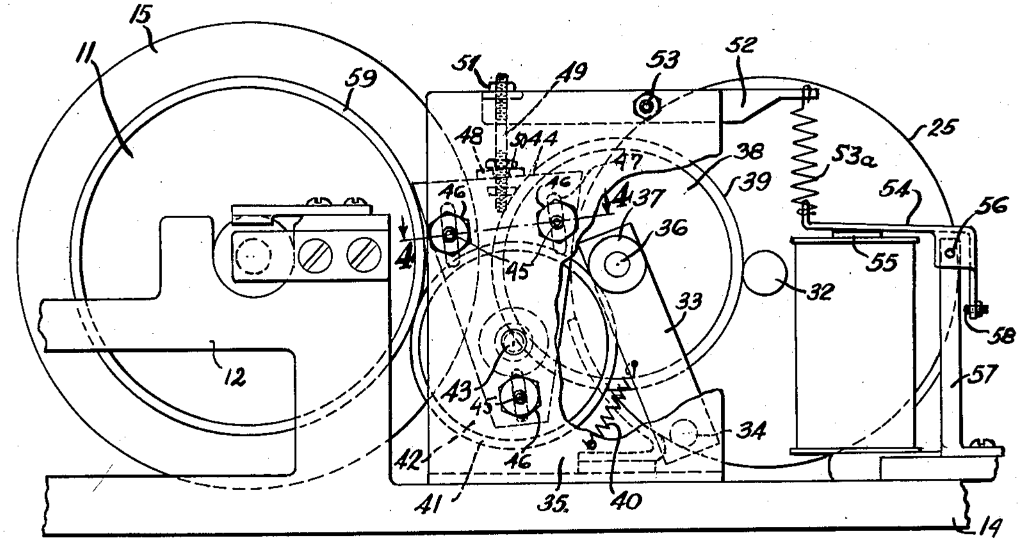
Figure 3 is an enlarged side view with some parts broken off, illustrating the drive.
Figure 5:
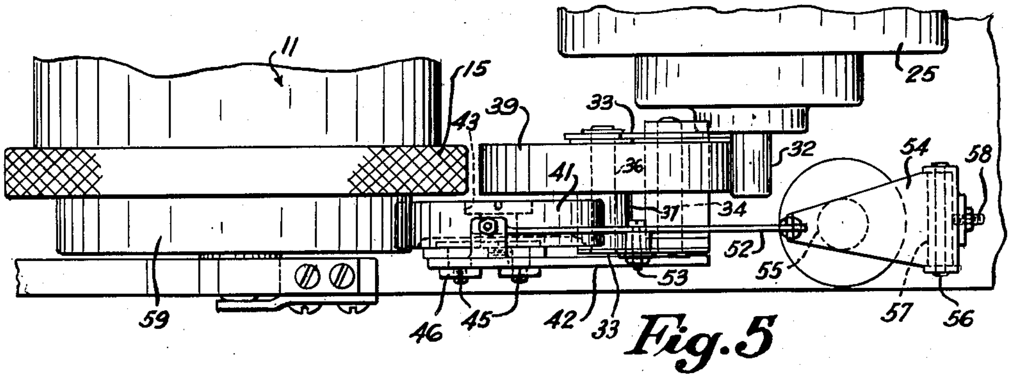
Figure 5 is a plan view of the drive shown in Figure 3.

The drive is effected by the electromotor 25 which is provided with a steel shaft or roller 32. As best shown in Figure 3, a lever or support 33 is located in an inclined position and is mounted at its lower end upon a pin or pivot 34 which is carried upon an upright or plate 35. The upright 35 constitutes a part of the machine frame. The upper end of the lever 33 carries a pivot 36 which supports a roller 37 and a wheel 38 which is integral with the roller 37. The lever 33 may be bifurcated and the roller 37 and the wheel 38 may be located between the prongs thereof. The wheel 38 is preferably provided with an outer rubber coating 39. A spring 40 extends between the lever 33 and the frame, and tends to press the roller 37 against the rubber-coated surface 41 of a wheel 42.

It is apparent that the spring 40 may be eliminated since, due to the inclined position of the lever 33, the weight of the roller 37 and the wheel 38 may suffice to establish pressure between the roller 37 and the disk 42.

Figure 4:
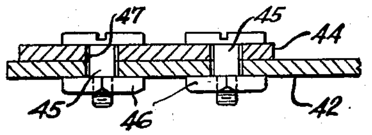
Figure 4 is a partial section along the line 4—4 of Figure 3.

The disk 42 is mounted upon a pivot 43 which is carried by a plate 44. The plate 44 is movable in relation to the support 35 and is held thereon by bolts 45 carrying wide nuts 46, the purpose of which is to maintain a flush condition. As shown in Figures 3 and 4, there are preferably three bolts 45 arranged in the form of a triangle, and extending through wide slots 47. The slots 47 are elongated in form and extend parallel to the central longitudinal axis of the plate 44. As best shown in Figure 4, a certain amount of play is provided between the walls of the slots 47 and the bolts 45. Due to this arrangement the plate 44 can move freely in relation to the bolts 45 and a certain adjustment of its position may take place, which may be caused by the provision of elastic rubber surfaces. On the other hand, any wobbling of the plate 44 is effectively eliminated by the wide form of the nuts 46 and by the relatively wide three-point support constituted by the three bolts 45.

It is apparent that the plate 44 carrying the wheel 42 can move up and down in relation to the support 35 within the limits of the slots 47, the movement of the plate 44 being guided by the bolts 45 and the nuts 46.

The plate 44 has an upper tongue 48 through which extends a threaded rod 49. A nut 50 maintains proper connection between the rod 49 and the plate 44. The upper end of the rod 49 is held by a nut 51 upon a horizontal lever 52, which is pivoted intermediate its ends by a pivot 53 upon the upright 35.

The opposite end of the lever 52 is connected by a spring 53*a* with a plate 54 located directly above a magnet 55 and adapted to be attracted thereby. The plate 54 is pivoted at 56 to a support 57 and its opposite end carries an adjustable stop 58 adapted to engage the support 57.

It is apparent that the roller 37 is always maintained in contact with the wheel 42, either by force of gravity or the pressure of the spring 40, or both. On the other hand, in the inoperative position when the magnet 55 is not energized, the plate 44 with the wheel 42 is situated in its downward position, in which the wheel 42 is out of engagement with the steel rim 59 which is integral with the drum 11. At the same time the lever 33 is in a position in which the wheel 38 is out of contact with the roller 32 although the roller 37 is pressed against the wheel 42. It is apparent that the pressure between the roller 37 and the wheel 42 is so small that the rubber coating 41 will not be damaged.

The machine is started by switching on the switch 28. Then the electrical current will flow through the wires 31 and conduits located within the casing 60 to the motor 25, which is thereby energized. The magnet 55 is operated through the switch 30.

The motor 25 will rotate its shaft or roller 32. The magnet 55 will attract the plate 54 so that the lever 52 will be inclined toward the magnet 55 and will pull upwardly the plate 44 and the roller 42 carried thereby. The roller 42 will move into engagement with the flange 59 of the drum 11. At the same time the roller 42 will push against the roller 37, which is in contact therewith, and will move the wheel 38, into engagement with the shaft 32. Due to this arrangement a driving connection will be established between the steel roller 32, the rubber-coated wheel 38, the steel roller 37, the rubber-coated wheel 42 and the steel drum portion 59. Thus, the drum 11 will be rotated and its rotation will be transmitted by the gear wheels 61, 62 and 63 to the threaded rod 20. Thus, the magnetic head 17 will move along the drum 11 while the drum is rotated and will record and reproduce sound upon a sheet carried by the drum 11.

It is apparent that due to the provision of play in the slots 47 of the plate 44 the wheels 32, 38, 37, 42 and 59 are pressed one against the other with substantially equal pressure.

While this pressure is considerably greater than that which prevails when the device is inoperative, the rubber-coated surfaces are not damaged since they keep on rotating. Thus, pressure is shifted from point to point over the entire rotary surface at that time, so that no point is subjected to excessive wear. By uniformly distributing the pressure, the force on each individual roller is maintained at a minimum, so that the wear is also very low.

The motor 25 is mounted upon vibration-free supports and the motor shaft or roller 32 is freely in contact with the wheel 38 during operation. Therefore, the vibrations of the motor 25 will not be transmitted to the contacting surfaces of the shaft 32. It is apparent that in the described system pressure is so balanced that adequate contact is maintained while a substantially equal distribution of pressure takes place.

The entire system is most elastic and is adapted to the mode of operation of the machine which requires continuous stopping and starting. Frequency flutter is effectively eliminated by the described system.

Figure 6:
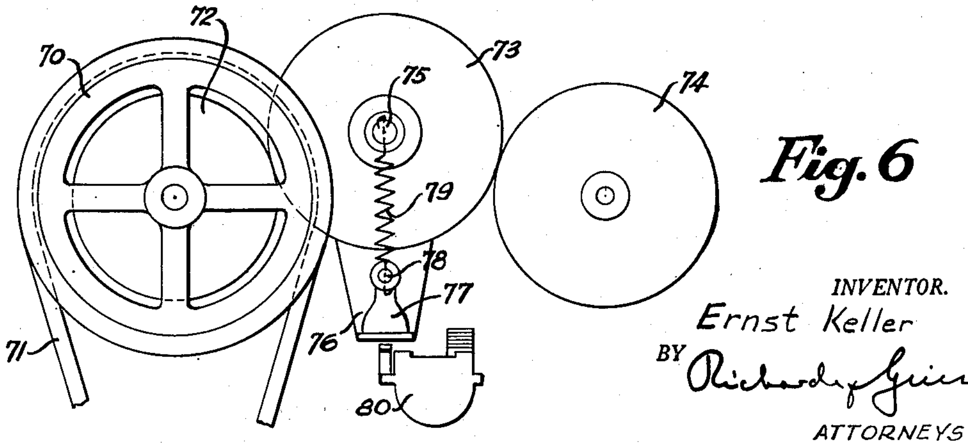
Figure 6 is a diagrammatic side view illustrating a drive of a somewhat different form.

The modification shown in Figure 6 constitutes a construction wherein a motor drives a wheel 70 over a rubber belt 71. The wheel 70 is firmly connected with a disk 72. An intermediate wheel 73 is movable vertically and is used to transmit rotation of the wheel 70 to a wheel 74 connected with the drum (not shown). The axle 75 of the wheel 73 is mounted upon a plate 76 which rests against a casing support (not shown). The plate has a slot 77 and an immovable guiding bolt 78 extends through this slot. The axle 75 is used for the further guiding of the plate 76. A spring 79 engages the bolt 78 and the axle 75, and has the tendency to press the intermediate wheel 73 against the wheels 72 and 74. A magnet 80 is used to disconnect the device since the force of the magnet 80 tends to push the plate 76 upwardly, thereby moving the wheel 73 out of engagement with the wheels 72 and 74. In other respects the construction may be essentially the same as described.

It is apparent that the example shown above has been given solely by way of illustration and not by way of limitation, and that it is subject to many variations and modifications without departing from the scope of the present invention. All such variations and modifications are to be included within the scope of the present invention.

What is claimed is:

1. In a sound recording and reproducing machine having a driving roller and a driven drum, a drive comprising, in combination, a lever having a pivoted end, a rotary device upon the other end of said lever, a rotary member, a pivot carrying said rotary member, a plate carrying said pivot, means supporting said plate for a shifting movement in a direction at right angles to said pivot, and means shifting said plate and said rotary member from an inoperative position to an operative position and vice versa, said rotary device being in engagement with said rotary member, said rotary member in its operative position engaging said drum and causing said rotary device to engage said driving roller.

2. In a sound recording and reproducing machine having a driving roller and a driven drum, a drive comprising, in combination a lever having a pivoted end, a rotary device upon the other end of said lever, a rotary member, a pivot carrying said rotary member, a plate carrying said pivot and having at least one elongated slot formed therein and extending in the direction of movement of said plate from an operative position to an inoperative position and vice versa, a pin extending with substantial play through said slot, whereby an adjustment of its position can take place, and means moving said plate and said rotary member from said inoperative position to an operative position and vice versa, said rotary device being in engagement with said rotary member, said rotary member in its operative position engaging said drum and causing said rotary device to engage said driving roller.

3. In a sound recording and reproducing machine having a driving roller and a driven drum, a drive comprising, in combination, a lever having a pivoted end, a rotary device upon the other end of said lever, a rotary member, a pivot carrying said rotary member, a plate carrying said pivot, means supporting said plate for a shifting movement in a direction at right angles to said pivot, and a magnet shifting said plate with the rotary member carried by the plate from an inoperative position to an operative position and vice versa, said rotary device being in engagement with said rotary member, said rotary member in its operative position engaging said drum and causing said rotary device to engage said driving roller.

ERNST KELLER.

REFERENCES CITED

The following references are of record in the file of this patent:

UNITED STATES PATENTS

| Number | Name | Date |
|---|---|---|
| 328,556 | Amet | Oct. 20, 1885 |
| 446,927 | Richards | Feb. 24, 1891 |
| 752,778 | Hundhausen | Feb. 23, 1904 |
| 1,415,128 | Suplee | May 9, 1922 |
| 1,870,421 | Prout | Aug. 9, 1932 |
| 2,200,574 | Davis | May 14, 1940 |
| 2,221,661 | Woolf | Nov. 12, 1940 |
| 2,244,120 | Schneider | June 3, 1941 |